United States Patent
Watanabe

(10) Patent No.: US 8,301,203 B2
(45) Date of Patent: Oct. 30, 2012

(54) TERMINAL WITH DISPLAY FUNCTION

(75) Inventor: Shintaro Watanabe, Osaka (JP)

(73) Assignee: KYOCERA Corporation, Kyoto (JP)

( * ) Notice: Subject to any disclaimer, the term of this patent is extended or adjusted under 35 U.S.C. 154(b) by 103 days.

(21) Appl. No.: 12/865,350

(22) PCT Filed: Feb. 3, 2009

(86) PCT No.: PCT/JP2009/051767
§ 371 (c)(1),
(2), (4) Date: Jul. 29, 2010

(87) PCT Pub. No.: WO2009/099053
PCT Pub. Date: Aug. 13, 2009

(65) Prior Publication Data
US 2010/0331052 A1    Dec. 30, 2010

(30) Foreign Application Priority Data

Feb. 5, 2008   (JP) ................ 2008-025471

(51) Int. Cl.
*H04B 1/38* (2006.01)
(52) U.S. Cl. ............. 455/566; 455/158.4; 455/158.5; 345/204
(58) Field of Classification Search ............. 455/566, 455/158.4, 158.5, 154.2, 418, 161.2; 345/204, 345/629, 671, 578
See application file for complete search history.

(56) References Cited

U.S. PATENT DOCUMENTS

| | | | |
|---|---|---|---|
| 6,661,425 B1 * | 12/2003 | Hiroaki | 345/629 |
| 7,292,235 B2 * | 11/2007 | Nose | 345/204 |
| 7,808,555 B2 * | 10/2010 | Aratani et al. | 348/578 |
| 7,848,783 B2 * | 12/2010 | Taneya et al. | 455/566 |
| 7,908,411 B2 * | 3/2011 | Kitagawa | 710/33 |
| 2005/0083642 A1 | 4/2005 | Senpuku et al. | |
| 2006/0285034 A1 * | 12/2006 | Aratani et al. | 349/90 |
| 2007/0216773 A1 | 9/2007 | Kojima et al. | |
| 2007/0255115 A1 * | 11/2007 | Anglin et al. | 600/300 |
| 2011/0012931 A1 * | 1/2011 | Abe | 345/671 |

FOREIGN PATENT DOCUMENTS

JP    2002-044202    2/2002

(Continued)

OTHER PUBLICATIONS

International Preliminary Report on Patentability issued in corresponding application No. PCT/JP2009/051767 on Aug. 19, 2010, 5 pages.

(Continued)

*Primary Examiner* — Minh D Dao
(74) *Attorney, Agent, or Firm* — Procopio, Cory, Hargreaves & Savitch LLP

(57) ABSTRACT

[Object]
To provide a terminal with a display function such as a mobile phone that allows a user to select easily desired image information from stored image information.
[Constitution]
When a user selects one file from a list screen of reduced images M5 in a first display state and then performs a switching operation to move to a second display state, a display control section 110 enables a comparison screen mode. Specifically, the display control section 110 sends out image signals for intermediate images M7, M8, and M9 corresponding to the selected file and anterior and posterior to the selected file to a liquid crystal display device 500, thereby to display the intermediate images M7, M8, and M9 on a second display surface 21. The three intermediate images M7, M8, and M9 are shown in maximum sizes within the second display surface 21.

9 Claims, 14 Drawing Sheets

FOREIGN PATENT DOCUMENTS

| | | |
|---|---|---|
| JP | 2005-086283 | 3/2005 |
| JP | 2007-206918 A | 6/2007 |
| JP | 2007-334651 | 12/2007 |
| KR | 20-0374450 Y1 | 1/2005 |
| KR | 10-0697410 B1 | 3/2007 |
| WO | 03077097 | 3/2002 |

OTHER PUBLICATIONS

Translation of International Preliminary Report on Patentability issued in corresponding application No. PCT/JP2009/051767 on Sep. 16, 2010, 7 pages.

Notification of Reasons for Refusal for Japanese Application No. 2008-025471 dated Jul. 6, 2010.

Notification of Reasons for Refusal dated Nov. 24, 2010 issued by the Japanese Patent Office for the corresponding Japanese Patent Application No. 2008-025471.

International Search Report from PCT/JP2009/051767 dated Mar. 10, 2009.

Notification of Grounds for Rejection dated Oct. 31, 2011, issued for counterpart Korean Patent Application No. 2010-7019656.

\* cited by examiner

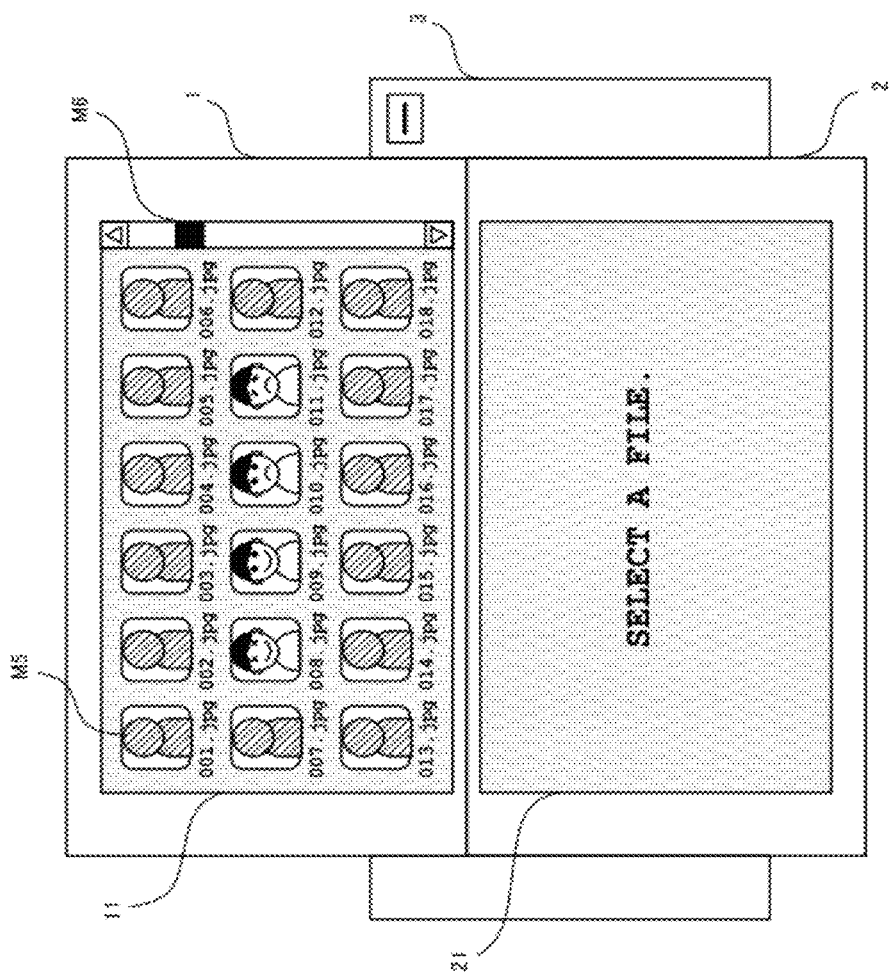

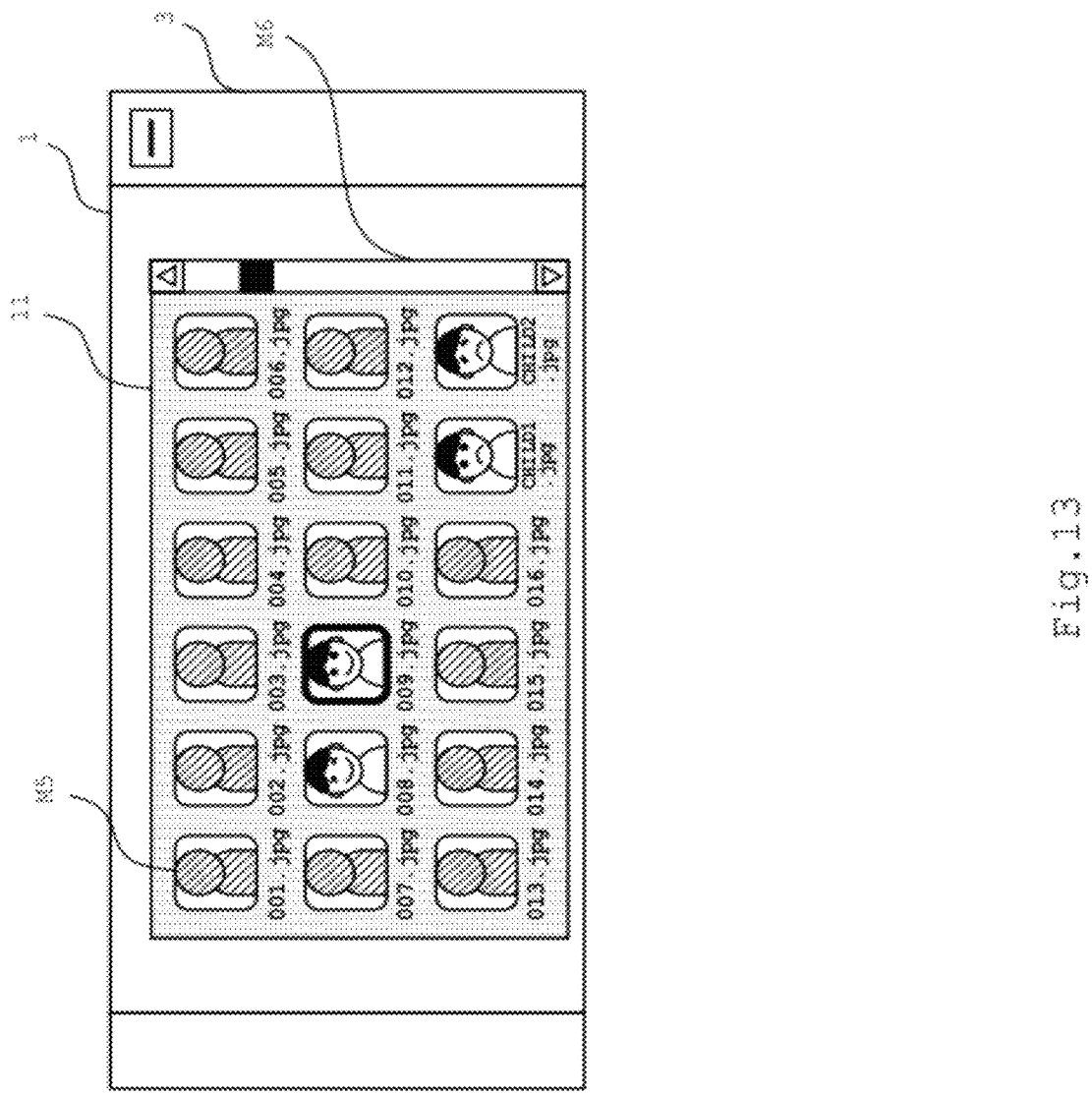

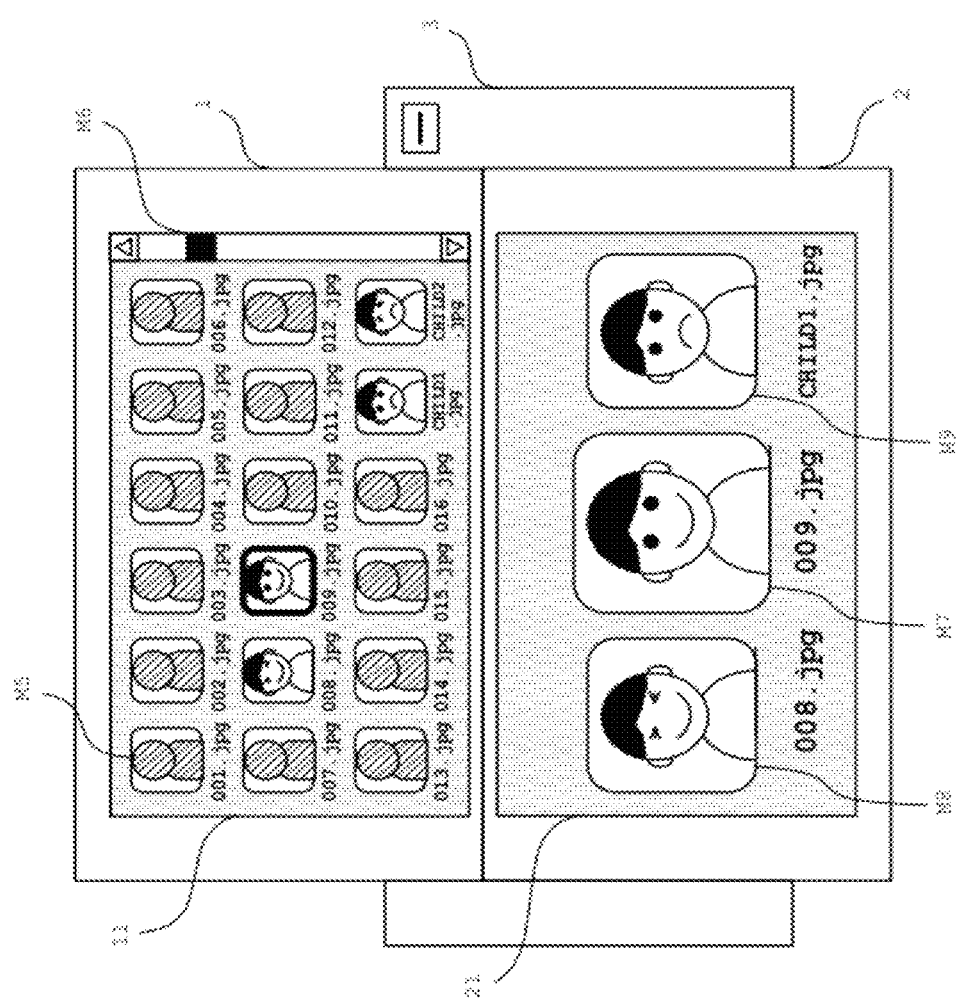

TERMINAL WITH DISPLAY FUNCTION

TECHNICAL FIELD

The present invention relates to terminals with a display function, and in particular is preferably suitable for use in portable terminals such as mobile phones, personal digital assistants (PDAs), and the like.

BACKGROUND ART

In general, portable terminals such as mobile phones are provided with liquid crystal display devices which show various kinds of information on display surfaces thereof. Large-sized display surfaces can show a great deal of information (such as document text) at one time and television pictures in large size. On the other hand, such large-sized display surfaces make the entire devices increased in size and prone to be too bulky to carry.

In light of such circumstances, for example, a mobile phone may be configured to include two display surfaces which can be switched between a state of being vertically overlapped and a state of being aligned sideways (for example, Patent Document 1). According to this mobile phone, when the two display surfaces overlap, the device becomes smaller in size and less prone to be too bulky to carry. Meanwhile, when the two display surfaces are aligned sideways, the mobile phone can display image in a large screen.

DISCLOSURE OF THE INVENTION

Problem to be Solved by the Invention

In the meantime, many mobile phones are equipped with a camera function. Images taken by the camera (still images and moving images) are saved in embedded memories or memory cards attached to the devices. In addition, many mobile phones are capable of downloading images from various web sites via a communication line, and save these images in embedded memories or the like.

Images saved in the memory are used to create reduced images (thumbnails) of the original images through a thumbnail creating process. Then, a list of these reduced images is shown on the display surface in a predetermined functional mode. A user can view the list of the reduced images to check what images are saved.

If the two display surfaces can be aligned sideways for a larger display area as in the aforementioned mobile phone, the entire list screen is increased in size to thereby enable arrangement of many reduced images at one time. This allows the user to select a desired one from the saved images without having to scroll the list screen frequently, thereby achieving enhancement in usability of the device.

However, in some cases, the saved images include a plurality of similar images such as a series of photographs. If a user intends to select a desired image (e.g. a best-shot photograph) from these similar images, the reduced images are too small in size to compare minutely. Therefore, it is desired that a desired image can be easily selected even in such a case.

To solve this issue, an object of the present invention is to provide a terminal with a display function such as a mobile phone that makes it easy to select desired image information from saved image information.

Means to Solve the Problem

A terminal with a display function of the present invention includes: a first display section having a first display surface; a second display section having a second display surface; a display control section for controlling displays on the first display section and the second display section; a storing section for storing a plurality of pieces of image information; and a switching section for switching the first display section and the second display section between a first display state in which only the first display surface is exposed and a second display state in which the first display surface and the second display surface are exposed. Here, in the first display state, the display control section exercises a first display control on the first display section to show a list of the plurality of pieces of image information in a first size, and in the second display state, the display control section exercises the first display control on one display section and exercises a second display control on the other display section to show image information selected from the list and image information meeting predetermined similarity standards with respect to the selected image information, in a second size larger than the first size.

According to the terminal with a display function of the present invention, the user can compare minutely the image information displayed in the second size on the other display surface, and therefore can select easily desired image information from the plurality of pieces of image information.

In the terminal with a display function of the present invention, the display control section may be configured to, in response to an instruction for enlargement of image information displayed under the second display control, show the image information in a third size larger than the second size. This allows the user to enlarge the desired image information to check the image information more minutely.

In the terminal with a display function of the present invention, the display control section may be configured to, in response to an instruction for scrolling of image information displayed under the second display control, scroll the displayed image information. This allows the user to scroll the image information displayed in the second size while comparing the image information in sequence.

In the terminal with a display function of the present invention, the display control section may be configured to, in the second display state, when a user selects desired image information from the list displayed under the first display control, update image information displayed under the second display control in accordance with the selection. Accordingly, even if previous image information and new image information are separately located on the screen of the list, the new image information can be instantly displayed in the second size.

In the terminal with a display function of the present invention, the image information may include moving image information. In this case, the display control section reproduces and displays the moving image information included in the display target under the second display control. This allows the user to understand easily that the image information is moving image information.

In the terminal with a display function of the present invention, the display control section may be configured to, when a user selects the image information in the first display state and then moves to the second display state, execute the first display control and the second display control in accordance with the movement. This allows the user to compare the image information through a simple operation.

In the terminal with a display function of the present invention, the display control section may be configured to, when a user does not select the image information in the first display state, execute the first display control on both the first and second display sections, in accordance with movement to the second display state. This allows the user to make a decision on whether to compare the image information through a simple operation.

In this case, the display control section may also be configured to, when a user selects one piece of image information after execution of the first display control on both the first and second display sections, display the image information in a third size larger than the second size. This allows the user to check individual details of the listed image information.

Advantage or significance of the present invention will be further understood from the description of an embodiment below. However, the following embodiment is merely an example for carrying out the present invention, and the present invention is not limited by the following embodiment.

BRIEF DESCRIPTION OF THE DRAWINGS

FIG. 12 is a diagram showing another example of a screen display of the mobile phone of the embodiment in the second display state under the screen display control in the data display mode;

FIG. 13 is a diagram showing an example of screen display of the mobile phone of the embodiment under the screen display control of configuration example 1 (modified example); and FIG. 14 is a diagram showing an example of screen display of the mobile phone of the embodiment under the screen display control of configuration example 1 (modified example).

BEST MODE FOR CARRYING OUT THE INVENTION

Figure 1:
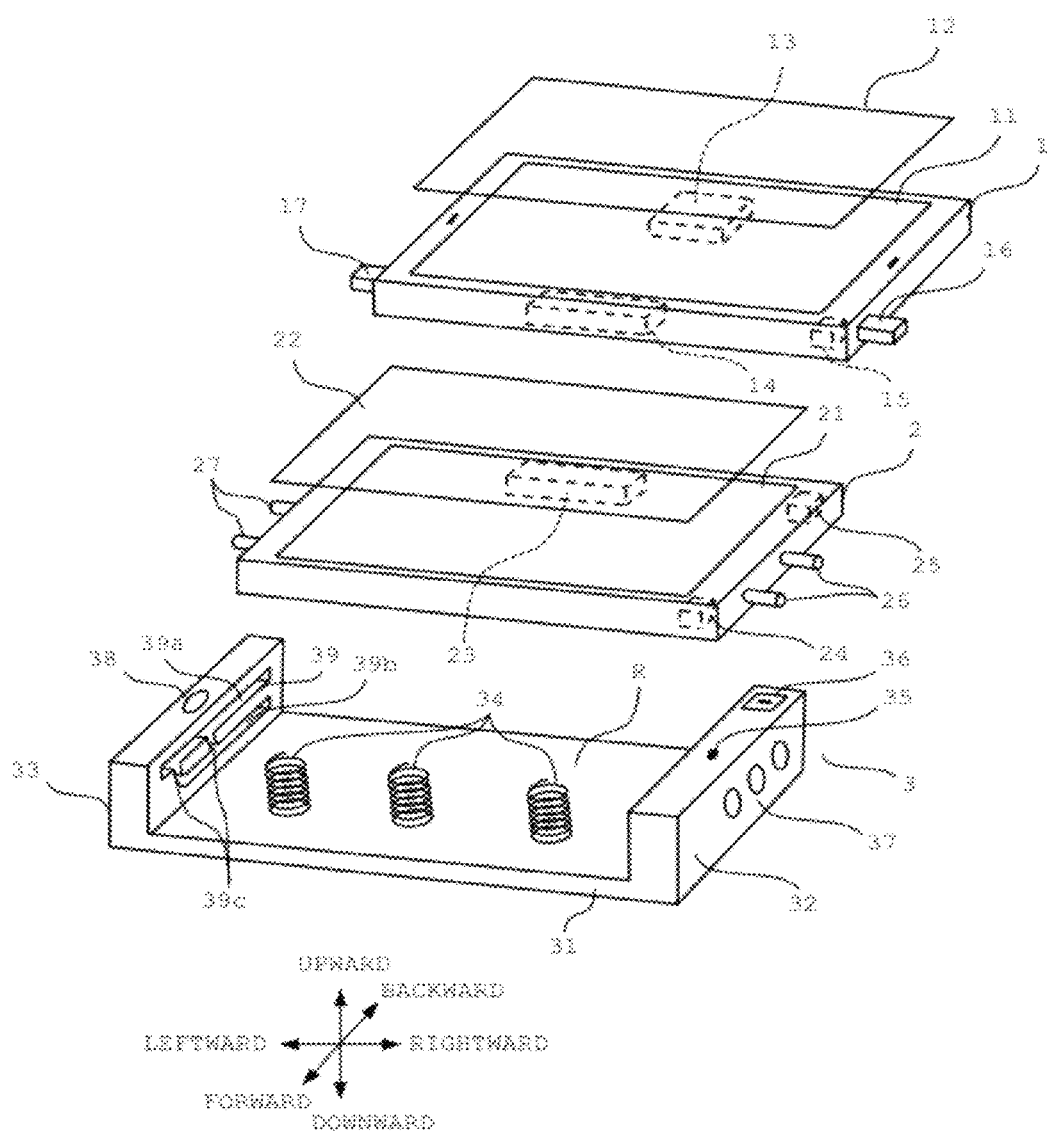
FIG. 1 is a diagram showing a configuration of a mobile phone of an embodiment.

An embodiment of the present invention will be described below with reference to the attached drawings.

In the embodiment described below, liquid crystal display devices 400 and 500 are equivalent to "first display section" and "second display section" described in the claims, respectively. A first display surface 11 and a second display surface 21 are equivalent to "first display surface" and "second display surface" described in the claims, respectively. Magnets 14 and 23, projections 16 and 17, shafts 26 and 27, coil springs 34, and guide grooves 39 are equivalent to "switching section" described in the claims. A memory 600 is equivalent to "storing section" described in the claims. In addition, reduced images M5 are equivalent to "image information in a first size" described in the claims, intermediate images M7, M8, and M9 are equivalent to "image information in a second size" described in the claims, and an enlarged image M10 is equivalent to "image information in a third size" described in the claims.

Moreover, the term "similarity standards" described in the claims constitute indicators for extracting image information seeming to be similar to selected image information. For example, similarity standards in the embodiment described below are position in a list, shooting date and time, and shooting position.

FIG. 1 is a diagram (exploded perspective view) showing a configuration of a mobile phone as one embodiment of the present invention. The mobile phone is constituted by a first cabinet 1, a second cabinet 2, and a holding body 3 for holding the first and second cabinets 1 and 2.

The first cabinet 1 has the shape of a vertically-thin, horizontally-long rectangular parallelepiped. The first cabinet 1 contains a liquid crystal display device (not shown) and has a first display surface 11 disposed on an upper surface thereof. The first cabinet 1 has a touch panel 12 attached on the first display surface 11. When a user presses any of various keys displayed on the first display surface 11, the touch panel 12 detects a pressed position and outputs a signal in accordance with the position (position signal).

The first cabinet 1 has a camera module 13 inside at a position slightly behind a center thereof. The first cabinet 1 has on a bottom surface thereof a lens window (not shown) for capturing an image of an object from the camera module 13. The first cabinet 1 also has a magnet 14 inside in a middle of vicinity of a front surface thereof and has a magnet 15 inside at a front right corner thereof. Further, the upper cabinet 1 has projections 16 and 17 on right and left surfaces thereof, respectively.

The second cabinet 2 has the shape of a vertically-thin, horizontally-long rectangular parallelepiped. That is, the second cabinet 2 is almost the same in shape and size as the first cabinet 1. The second cabinet 2 contains a liquid crystal display device (not shown) and has a second display surface 21 disposed on an upper surface thereof. The second display screen 21 is identical in size to the first display surface 11. The second cabinet 2 has a touch panel 22 attached on the second display surface 21. When a user presses any of various keys displayed on the second display surface 21, the touch panel 22 detects a pressed position and outputs a signal in accordance with the position (position signal).

The second cabinet 2 has a magnet 23 inside in a middle of vicinity of a rear surface thereof. The magnet 23 and the first cabinet's magnet 14 are configured to attract each other when the first cabinet 1 and the second cabinet 2 are positioned so as to constitute a large-sized screen as stated later (the second display state). Alternatively, if either the first cabinet 1 or the second cabinet 2 is significantly large in magnetic force, the other magnet may be replaced with any magnetic material.

The second cabinet 2 has a closing sensor 24 inside at a front right corner thereof and has an opening sensor 25 at a back right corner thereof. The closing sensor 24 and the opening sensor 25 are constituted by hall ICs or the like, for example, and output detection signals in response to magnetic force of the magnet 15. As described later, when the first cabinet 1 and the second cabinet 2 are overlapped, the magnet 15 of the first cabinet 1 becomes closer to the closing sensor 24, and then the closing sensor 24 outputs an ON signal. Meanwhile, when the first cabinet 1 and the second cabinet 2 are aligned horizontally, the magnet 15 of the first cabinet 1 becomes closer to the opening sensor 25, and therefore the opening sensor 25 outputs an ON signal.

Further, the second cabinet 2 has two shafts 26 on a right surface thereof and has two shafts 27 on a left surface thereof.

The holding body 3 is constituted by a bottom plate section 31, a right holding section 32 formed at a right end of the bottom plate section 31, and a left holding section 33 formed at a left end of the bottom plate section 31. The first cabinet 1 and the second cabinet 2, in a vertically overlapping state, are accommodated in an accommodation region R surrounded by the bottom plate section 31, the right holding section 32, and the left holding section 33.

The bottom plate section 31 has three coil springs 34 arranged horizontally. When the second cabinet 2 is attached to the holding body 3, the coil springs 34 contact the bottom surface of the second cabinet 2 to thereby apply an upward pressing force to the second cabinet 2.

The right holding section 32 has a microphone 35 and a power button 36 on an upper surface thereof. In addition, the right holding section 32 has an operation button group 37 on an outer surface thereof. The operation button group 37 includes a plurality of operation buttons such as a manner-mode setting button. These operation buttons can be operated to perform certain functions without the need for manipulating the touch panels 12 and 22. The left holding section 33 has a speaker 38 on an upper surface thereof. A user uses the mobile phone to make a call with the left holding section 33 at his/her ear and the right holding section 32 at his/her mouth.

The right holding section 32 and the left holding section 33 have guide grooves 39 (shown only at the left holding section 33) on inner surfaces thereof. The guide grooves 39 are constituted by: an upper groove 39*a* and a lower groove 39*b*, two of which extend in a front-back direction; and two vertical grooves 39*c* formed at a front side of the grooves and extending vertically so as to connect to the upper groove 39*a* and the lower groove 39*b*.

When the mobile phone is assembled, the shafts 26 and 27 are inserted into the lower grooves 39*b* of the guide grooves 39 to thereby place the second cabinet 2 in the accommodation region R of the holding body 3, and then the projections 16 and 17 are inserted into the upper grooves 39*a* of the guide grooves 39 to thereby place the first cabinet 1 in the accommodation region R of the holding body 3 above the second cabinet 2.

Accordingly, the first cabinet 1 is guided by the upper grooves 39*a* so as to be slidable in a front-back direction. In addition, the second cabinet 2 is guided by the lower grooves 39*b* so as to be slidable in front-back direction. Further, when the second cabinet 2 moves forward and then the shafts 26 and 27 reach the vertical grooves 39*c*, the second cabinet 2 is guided by the vertical grooves 39*c* so as to be slidable in a vertical direction.

Figure 2:
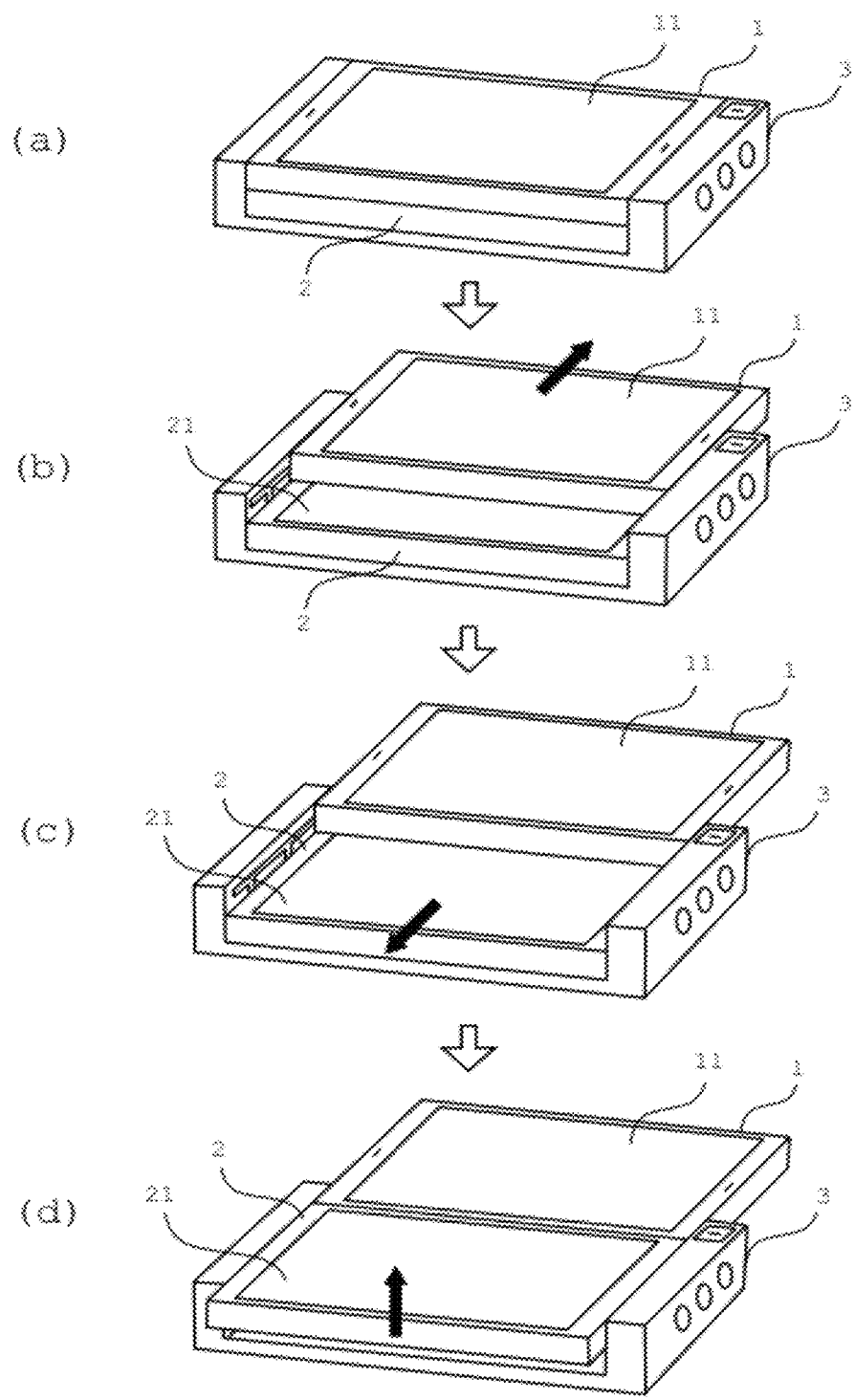
FIG. 2 is a diagram for describing a switching operation in the mobile phone of the embodiment from a first display state on a first display surface to a second display state on the first display surface and a second display surface.

FIG. 2 is a diagram for describing a switching operation in the mobile phone of the embodiment from a first display state with the first display surface 11 to a second display state with the first display surface 11 and the second display surface 21.

In an initial state as shown in FIG. 2 (*a*), the second cabinet 2 is hidden behind the first cabinet 1. Under this state, only the first display surface 11 is externally exposed. This state refers to "first display state." State switching is performed by a user's manual operation.

First, the user moves the first cabinet 1 backward as shown in FIG. 2 (*b*). Then, upon completion of backward movement of the first cabinet 1, the user draws out the second cabinet 2 forward as shown in FIG. 2 (*c*). By this draw-out operation, the second cabinet 2 moves to a position where the second cabinet 2 does not overlap the first cabinet 1 at all, that is, a position where the second cabinet 2 is situated in front of the first cabinet 1. Accordingly, the shafts 26 and 27 reach the vertical grooves 39*c* as stated above, and then the second cabinet 2 is pressed and raised by the coil spring 34. At that time, the magnet 14 and the magnet 23 attract each other to thereby exert a larger rising power. Accordingly, as shown in FIG. 2 (*d*), the first cabinet 1 and the second cabinet 2 are aligned so as to be attached to each other in a front-back direction and be flush with each other. The first display surface 11 and the second display surface 21 are integrated into one large-sized screen. This state refers to "second display state."

Figure 3:
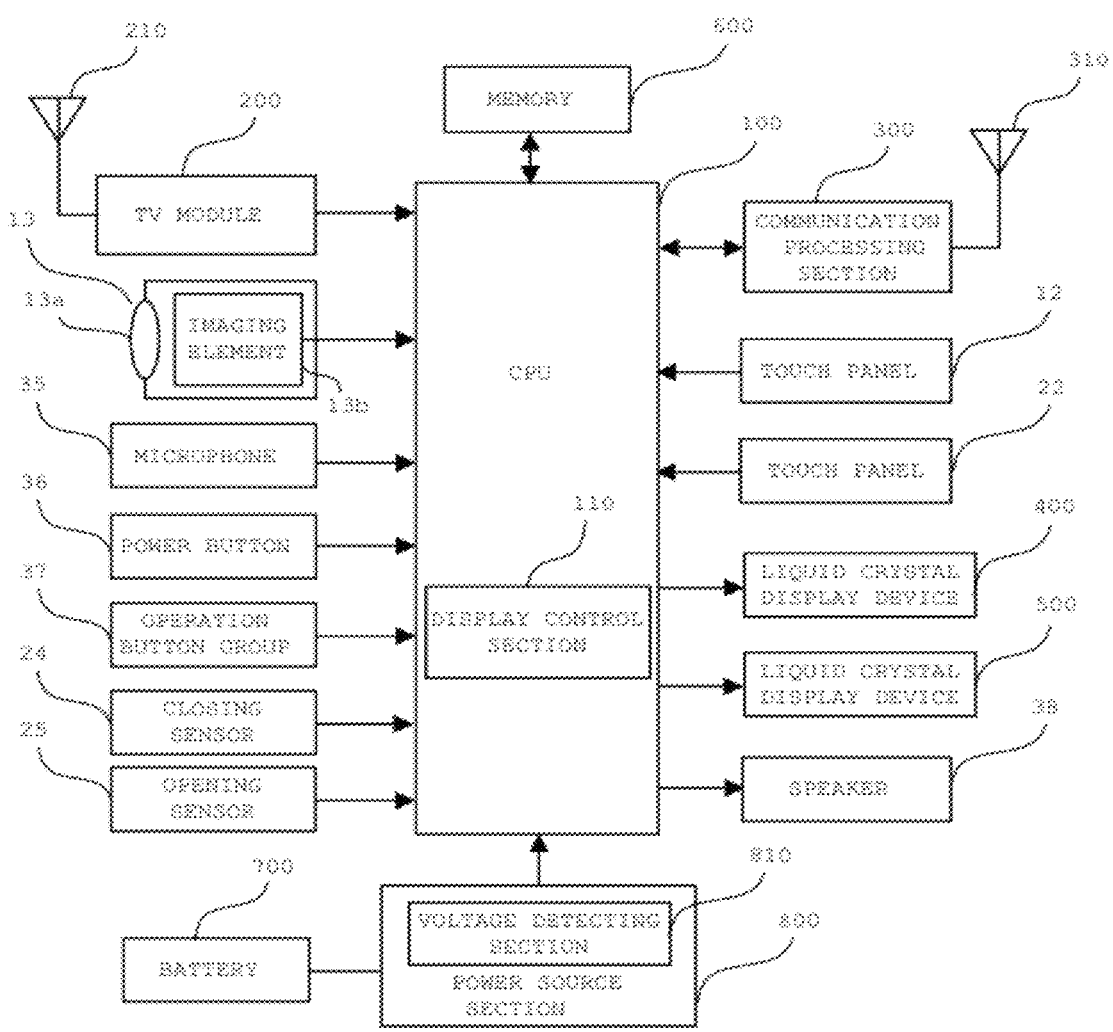
FIG. 3 is a block diagram showing a circuit configuration in the mobile phone of the embodiment.

FIG. 3 is a block diagram showing a circuit configuration of the mobile phone of this embodiment. In addition to the constitutional elements described above with reference to FIG. 1, the mobile phone also includes a CPU 100, a TV module 200, a communication processing section 300, liquid crystal display devices 400 and 500, a memory 600, a battery 700, and a power source section 800.

The TV module 200 includes a TV tuner and the like, and converts radio waves such as digital terrestrial broadcast waves received via an antenna 210 into image signals, and sends the same to the CPU 100.

The camera module 13 is composed of an imaging lens 13*a*, an imaging element 13*b*, and the like. The imaging lens 13*a* forms an image of an object on the imaging element 13*b*. The imaging element 13*b* is formed by a CCD, for example, and generates an imaging signal in accordance with a captured image and sends the same to the CPU 100.

The microphone 35 converts an audio signal into an electric signal and sends the same to the CPU 100. The speaker 38 reproduces the audio signal from the CPU 100 in audio representation.

The communication processing section 300 converts audio signals, image signals, text signals and the like from the CPU 100 into radio signals, and transmits the same to a base station via an antenna 310. The communication processing section 300 also converts radio signals received via the antenna 310 into audio signals, image signals, text signals and the like, and sends the same to the CPU 100.

The liquid crystal display device 400 includes a liquid crystal panel constituting the first display surface 11, a backlight device, and the like, and displays on an image on the first display surface 11 in accordance with a drive signal from the CPU 100 (a display control section 110 described later). Similarly, the liquid crystal display device 500 includes a liquid crystal panel constituting the second display surface 21, a backlight device, and the like, and displays an image on the second display surface 21 in accordance with a drive signal from the CPU 100.

The memory 600 stores image data (still images and moving images) taken by the camera module 13, image data (still images and moving images) captured from the outside via the communication processing section 300, text data (mail data) and the like, in predetermined file formats.

The battery 700 is intended to supply power to the CPU 100 and other components of the mobile phone, and is formed by a secondary battery. The battery 700 is connected to the power source section 800.

The power source section 800 converts a voltage of the battery 700 into voltages of magnitudes required for the components of the mobile phone, and supplies the same to the components. In addition, the power source section 800 charges the battery 700 by supplying the battery 700 with power supplied from an input of an external power source (not shown).

The power source section 800 has a battery voltage detecting section 810. The voltage detecting section 810 detects a voltage of the battery 700 and sends the same to the CPU 100.

The CPU 100 outputs control signals to the components such as the speaker 300 and the liquid crystal display devices 400 and 500, in accordance with input signals from the components such as the touch panels 12 and 22, the operation button group 37, the microphone 35, and the imaging element 13b, to thereby perform communication processing and various mode operations (telephone mode, mail mode, Internet mode, television mode, camera mode, and the like). In addition, the CPU 100 determines a remaining level in the battery 700 in accordance with a voltage signal from the voltage detecting section 810.

The CPU 100 includes the display control section 110. The display control section 110 produces images to be displayed on the liquid crystal display devices 400 and 500, in a memory (not shown) as a working area prepared in the CPU 100, and outputs image signals (RGB signals) for displaying the produced images to the liquid crystal display devices 400 and 500. In addition, the display control section 110 captures image data transferred from the imaging element 13b, image data stored in the memory 600, image data received via the communication processing section 300, and the like. Then, the display control section 110 generates image signals (RGB signals) from the captured image data, and outputs the generated image signals to the liquid crystal display devices 400 and 500. Accordingly, the liquid crystal display devices 400 and 500 show the images in accordance with the image signals.

When the mobile phone is in the first display state with the second cabinet 2 closed, an image is displayed on the first display surface 11.

Figure 4:
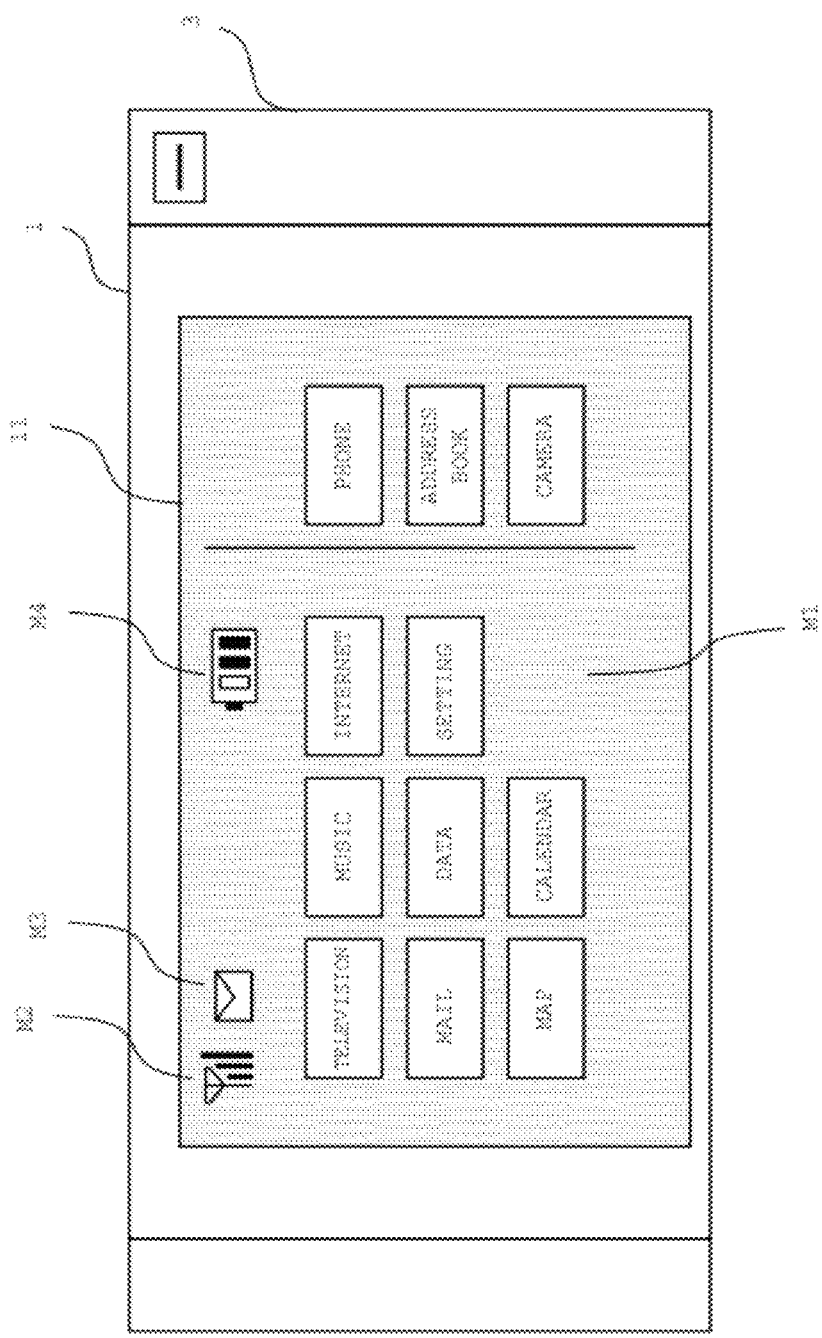
FIG. 4 is a diagram showing a display example of an initial screen (mode selection screen) displayed in the first display state on the first display surface of the mobile phone of the embodiment.

FIG. 4 is a diagram showing a display example of the mobile phone of the embodiment where the initial screen (functional mode selection screen) is displayed on the first display surface 11 in the first display state.

The first display surface 11 has at a central part thereof eleven mode keys M1 such as "television," "mail," and "map" as a main display. When the user presses a desired mode key M1 on the screen, the functional mode in accordance with the pressed mode key M1 is enabled. The first display surface 11 has at an upper part thereof a signal meter M2 indicative of a reception status, an e-mail mark M3 indicative of incoming e-mail, and a remaining battery level mark M4 indicative of a remaining battery level, as a sub display.

On the initial screen, if the user presses down the "data" mode key M1, for example, the device moves to the data display mode. In the data display mode, the user can perform a predetermined operation to check images (photographs or the like) saved in the memory 600. In some cases, the user may use this mode for the purpose of simply viewing these images. Meanwhile, the user may use this mode for the purpose of selecting a desired image from these images. In the latter case, the selected image may be used as a wallpaper for standby display on the mobile phone, may be transferred to another device such as a personal computer, or may be attached to an mail message and sent to other person(s).

Figure 5:
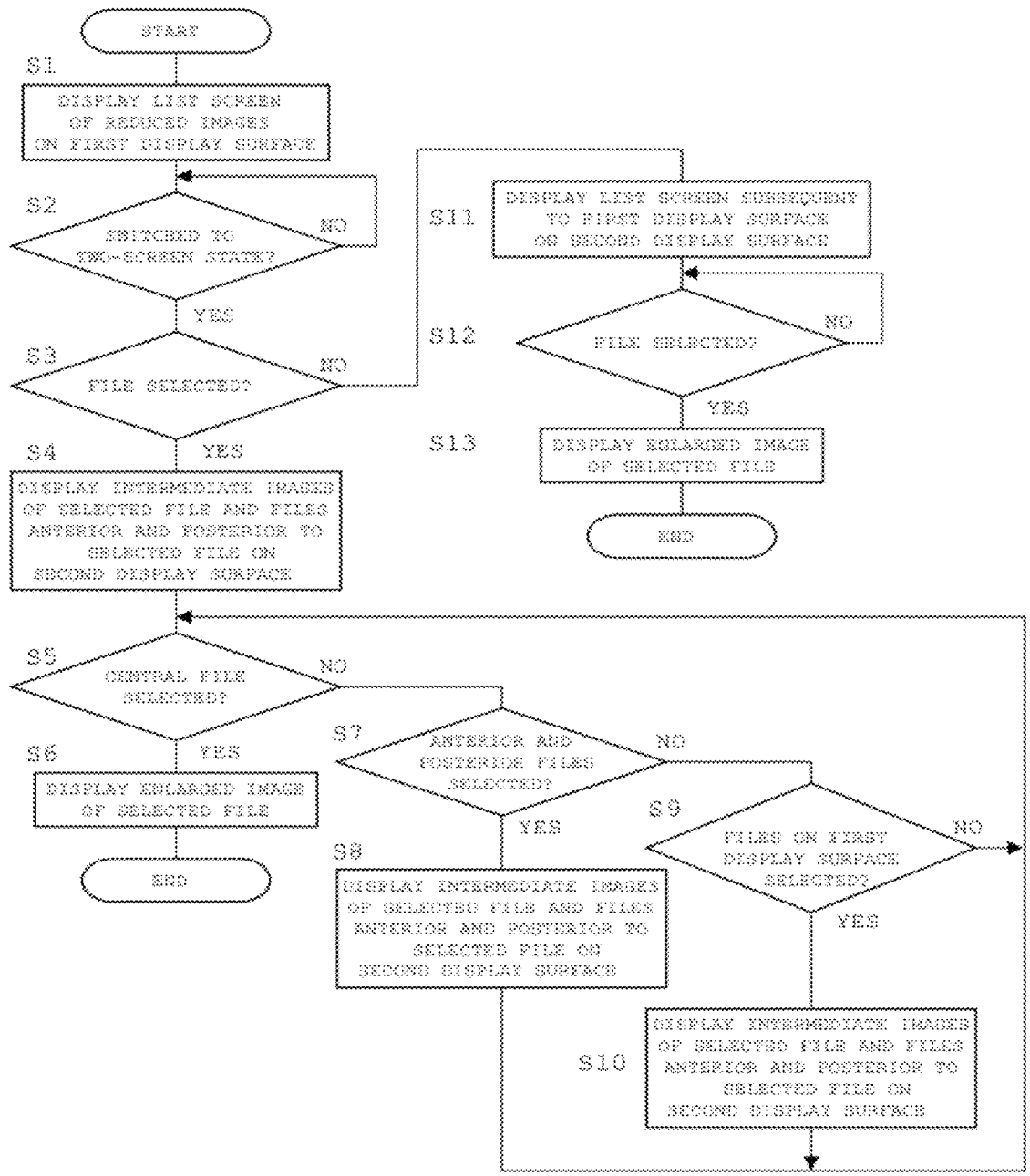
FIG. 5 is a flowchart for describing a screen display control of the mobile phone of the embodiment in a data display mode.
Figure 6:
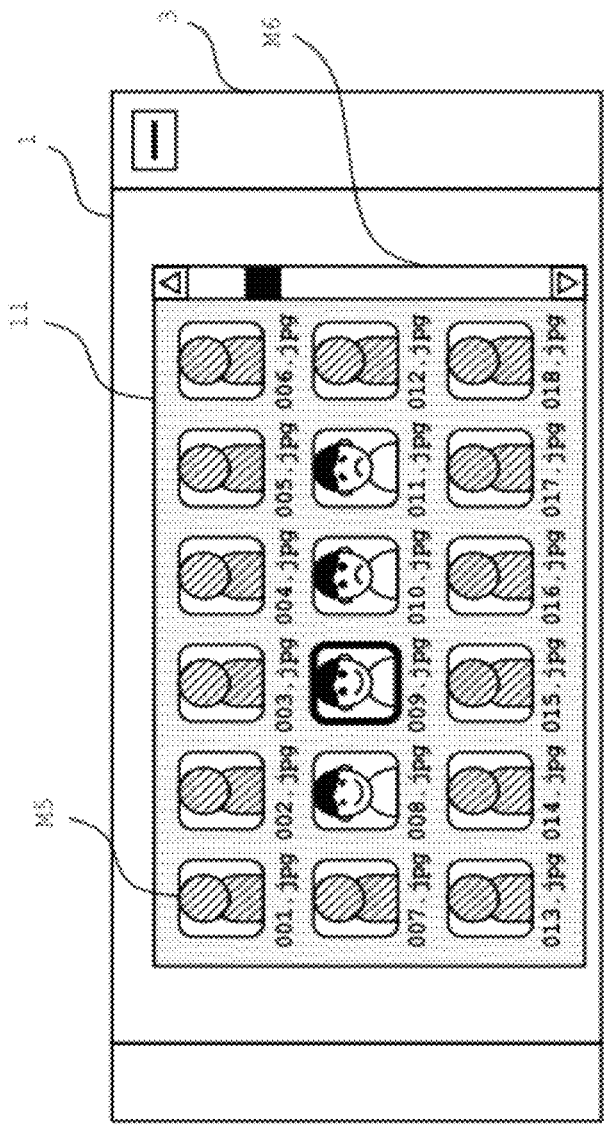
FIG. 6 is a diagram showing an example of screen display of the mobile phone of the embodiment under the screen display control in the data display mode.

FIG. 5 is a flowchart for describing a screen display control of the mobile phone of this embodiment in the data display mode. FIGS. 6 to 10 are diagrams showing examples of screen display on the mobile phone of this embodiment under the screen display control in the data display mode.

If the "data" mode key M1 is pressed as stated above, the display control section 110 reads image data of reduced images M5 from the memory 600 and sends out an image signal for displaying these reduced images M5 to the liquid crystal display device 400. Accordingly, the first display surface 11 shows a list screen on which the reduced images M5 are arranged (S1: refer to FIG. 6). On the list screen, the reduced images M5 have respective file names thereunder. In addition, the list screen has at a right end thereof a scroll operating section M6 for advancing the list screen.

The reduced images M5 constitute samples (indexes) of original images saved in the memory 600 (hereinafter, referred to "original images"). The image data of the reduced images M5 is generated by subjecting the image data of the original images to thumbnail processing, and is stored in the memory 600.

When selecting a desired image, the user can view the reduced images M5 displayed on the list screen in sequence and specify the desired one as stated above. However, the images saved in the memory 600 may include a plurality of images similar to the desired image such as a series of photographs. If the user intends to select a desired image (for example, a best-shot photograph) from these similar images, the reduced images M5 are too small in size to compare minutely.

In such a case, the user selects one of a plurality of reduced images M5 to be compared, and touches the image with a finger or the like. If one file (e.g. "009.jpg") is selected, the reduced image M5 of the file is then displayed in a form different from the other reduced images M5. For example, the image may be displayed with a bolder-line frame. After selecting the desired file as stated above, the user performs a switching operation to turn the mobile phone into the second display state.

When the user performs the switching operation to turn the device into the second display state, the opening sensor 25 inputs an ON signal into the CPU 100. In response to the ON signal, the display control section 110 determines that the switching operation has been performed (S2: YES). The display control section 110 may be configured to determine that the switching operation has been performed when a signal from the closing sensor 24 is turned off, or may be configured to determine that the switching operation has been performed when there is no ON signal from the closing sensor 24 and there is an ON signal from the opening sensor 25.

Next, the display control section 110 determines whether one of the reduced images M5 displayed in the first display state has been touched by the user to select a file corresponding to the reduced image M5 (S3). Then, if determining that the file is selected (S3: YES), the display control section 110 enables a comparison screen mode through actions of steps S4 to S10 described below.

Specifically, the display control section 110 reads image data of an original image of the selected file from the memory 600, and generates an image signal of an intermediate image M7 corresponding to the original image. In addition, the display control section 110 also reads image data of original images of files anterior and posterior to the selected file from the memory 600, and generates image signals for an intermediate image M8 and an intermediate image M9. Then, the display 100 sends out the image signals of these intermediate images M7, M8, and M9 to the liquid crystal display device 500 to display these intermediate images M7, M8, and M9 on the second display surface 21 (S4: refer to FIG. 7).

Figure 7:
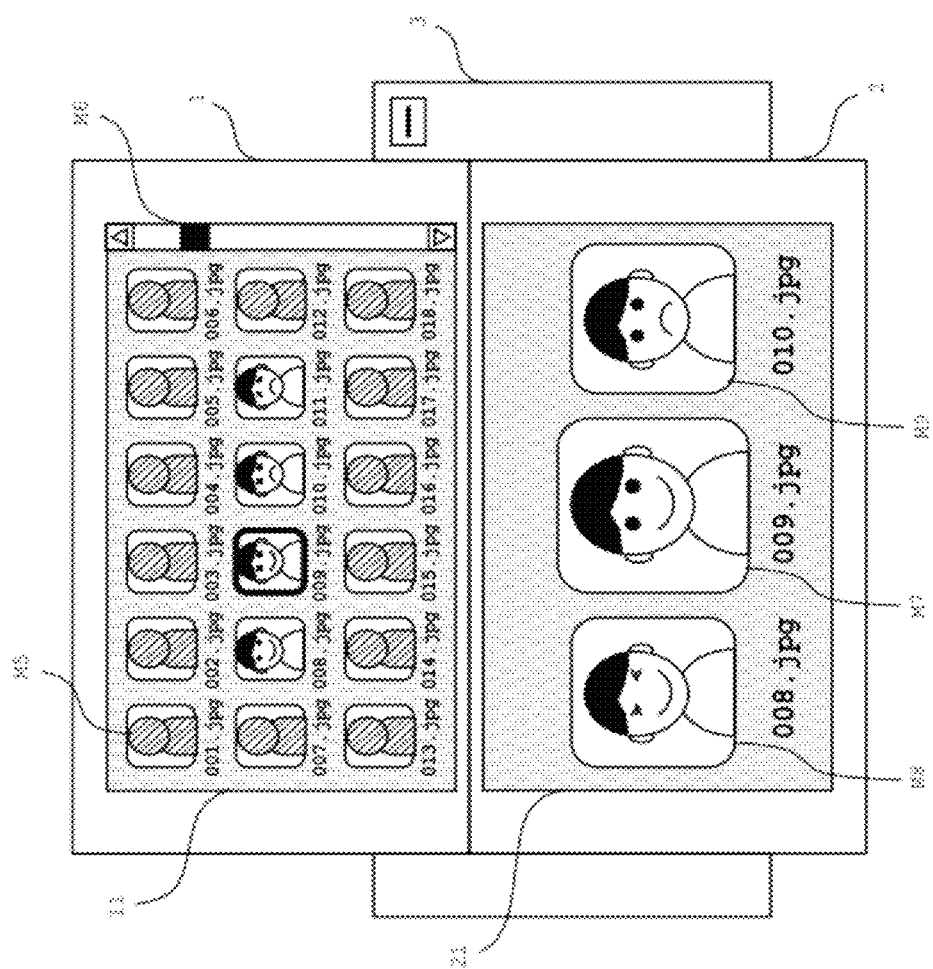
FIG. 7 is a diagram showing an example of screen display of the mobile phone of the embodiment under the screen display control in the data display mode.

As shown in FIG. 7, the second display surface 21 shows the intermediate image M7 of the selected file (e.g. "009.jpg") at a center of the screen. In addition, the second display surface 21 shows the intermediate image M8 of the file anterior to the selected file (e.g. "008.jpg") on a left side of the intermediate image M7, and the intermediate image M9 of the file posterior to the selected file (e.g. "010.jpg") on a right side of the intermediate image M7. These three intermediate images M7, M8, and M9 are displayed in as larger sizes as possible within the second display surface 21. In particular, the central intermediate image M7 is displayed in a larger size than the left and right intermediate images M8 and M9. In addition, the intermediate images M7, M8, and M9 have respective file names thereunder.

Accordingly, the second display surface 21 shows the three successive intermediate images M7, M8, and M9 in significantly larger sizes than the reduced images M5. This allows the user to compare minutely these intermediate images M7, M8, and M9 and select a desired image.

On the screen showing the three intermediate images M7, M8, and M9 (hereinafter, referred to as "comparison screen") of the second display surface 21, if the user touches the central intermediate image M7, the display control section 110 determines that the central file is selected (S5: YES), and reads the image data of the original image of the selected file from the memory 600 and then generates an image signal for an enlarged image M10. Then, the display control section 110 sends out the image signal for the enlarged image M10 to the liquid crystal display device 500 to display the enlarged image M10 on the second display surface 21 (S6: refer to FIG. 8). The enlarged image M10 is shown in a maximum size within the second display surface 21. This allows the user to check the image of the selected file more minutely.

The display control section 110 may be configured to display an enlarged image on the first display surface 11, not on the second display surface 21. Alternatively, the display control section 110 may be configured to display an enlarged image on a large screen formed by the first display surface 11 and the second display surface 21, in a maximum size within the large screen.

Figure 9:
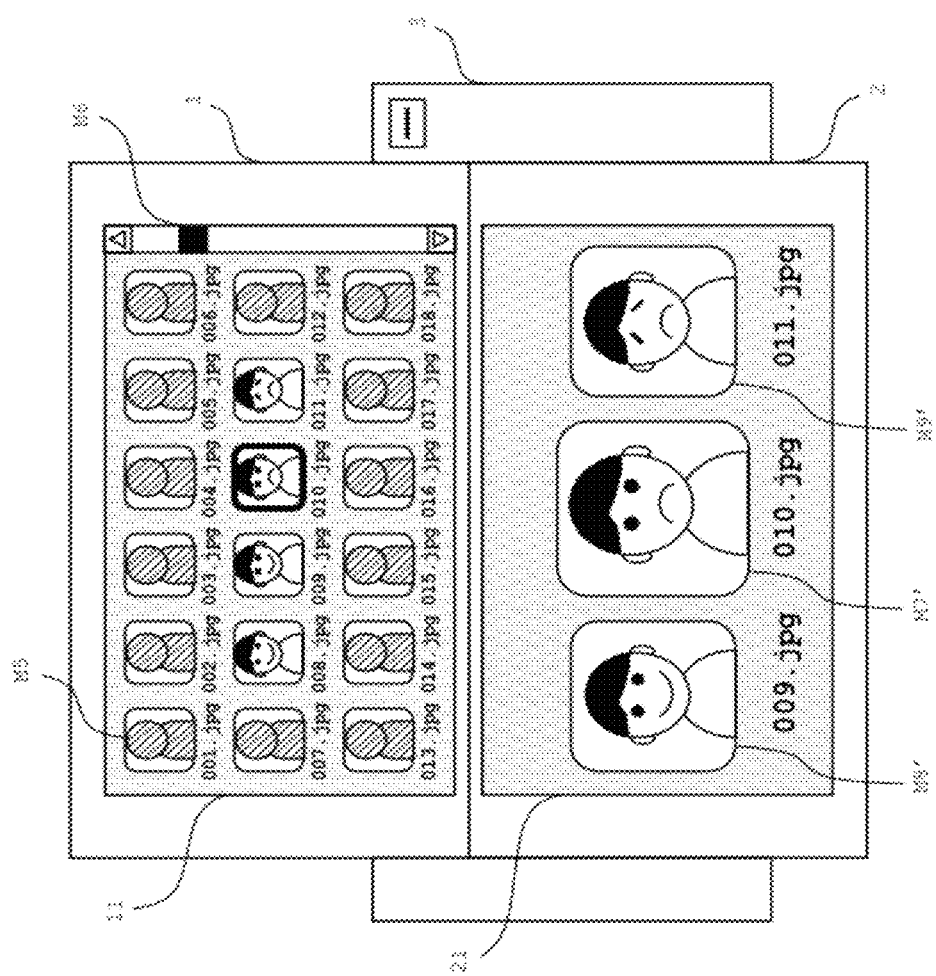
FIG. 9 is a diagram showing an example of screen display of the mobile phone of the embodiment under the screen display control in the data display mode.

Meanwhile, if the user touches either of the right and left intermediate images M8 and M9 on the comparison screen, not the central intermediate image M7, the display control section 110 determines that the left or right file is selected (S7: YES), and performs the same process as that of step S4 to display an intermediate image M7' of the selected file at the center of the second display surface 21 and display intermediate images M8' and M9' of files anterior and posterior to the selected file on left and right sides of the intermediate image M7' (S8). For example, if the file "010.jpg" is selected as shown in FIG. 7, the display control section 110 displays the intermediate image M7' of the file at the center of the screen, and displays the intermediate images M8' and M9' of the files "009.jpg" and "011.jpg" on the left and right sides of the selected file, as shown in FIG. 9. This allows the user to scroll the comparison screen up and down on the second display surface 21 and compare the three intermediate images M7', M8', and M9' newly displayed through the scrolling.

Further, the user may wish to display intermediate images of files (for example, "001.jpg" to "003.jpg") distant on the list screen from the currently displayed files (for example, "008.jpg" to "010.jpg"), on the comparison screen. In this case, the user may scroll the comparison screen through the scrolling operation until the intermediate images of these files appear on the second display surface 21, but this method will take a long time.

Therefore, in this case, the user touches the reduced image M5 of a desired file (e.g. "002.jpg") on the list screen of the first display surface 11. If determining that the file is selected on the list screen (S9: YES), the display control section 110 performs the same action as that of step S4 described above. Accordingly, the second display surface 21 shows three images, that is, an intermediate image of the selected file and intermediate images of the files anterior and posterior to the selected file (S10). This allows the user to display instantly the intermediate images of the files distant from the currently displayed files, on the second display surface 21.

Meanwhile, if not selecting any desired image from the similar images such as a series of photographs, the user does not need to compare the images.

In this case, when the list screen of the reduced images M5 appears in the first display state (refer to FIG. 6), the user performs a switching operation to turn the device into the second display state without selecting any file. Accordingly, the display control section 110 determines at previous step S3 that no file is selected (S3: NO), and enables a list screen mode through actions of steps S11 to S13 described below.

Specifically, the display control section 110 reads image data of reduced images M5 subsequent to the reduced image M5 displayed on the first display surface 11 from the memory 600, and sends out an image signal for displaying these reduced images M5 to the liquid crystal display device 500. Accordingly, the second display surface 21 shows a list screen of the reduced images M5 subsequent to the first display surface 11 (S11: refer to FIG. 10). In this case, the list screen of the first display surface 11 and the list screen of the second display surface 21 are integrated into one screen. Therefore, as the user operates the scroll operating section M6, the integrated list screen is scrolled.

Next, if the user selects a desired file on the list screen formed by the first display surface 11 and the second display surface 21 (S12: YES), the display control section 110 performs the same action as that of step S6 described above. Accordingly, the second display surface 21 displays the enlarged image M10 of the selected file (S13). In this case, the screen configuration is identical to that shown in FIG. 8. This allows the user to view the desired image in a large size.

According to this embodiment, as stated above, the comparison screen mode is enabled in the second display state where the first display surface 11 and the second display surface 21 are externally exposed. In this comparison screen mode, the second display surface 21 displays the intermediate images M7, M8, and M9 in larger sizes than the reduced images M5, in correspondence with the file selected from the reduced images M5 on the first display surface 11 and the files anterior and posterior to the selected file. This allows the user to compare these intermediate images minutely on the second display surface 21. Accordingly, even if images saved in the mobile phone include similar images such as a series of photographs, the user can select easily a desired image from these images.

In addition, according to this embodiment, the user can further select a file on the comparison screen showing the intermediate images M7, M8, and M9 and display the enlarged image M10 of the selected file. Therefore, the user can further enlarge the desired image as necessary to check the image more minutely.

Further, according to this embodiment, the comparison screen is scrolled up and down by the user's scrolling operation to display new intermediate images. This allows the user to compare intermediate images while advancing the images in sequence, thereby achieving enhancement in usability of the device.

In addition, according to this embodiment, when the user newly selects a file from the list screen on the first display surface 11, the second display surface 21 newly displays intermediate images of the selected file and files anterior and posterior to the selected file. Accordingly, even if intermediate images of files to be displayed on the second display surface 21 are located separately from the currently displayed files, the user can display instantly those intermediate images with enhanced usability.

Further, according to this embodiment, the user can enable the comparison screen mode by performing a predetermined transition operation of selecting a file before switching to the second display state. Meanwhile, if the user does not perform such a predetermined transition operation, the list screen mode is enabled. Therefore, if the user does not need to compare similar images, the user can select a reduced image M5 on the list screen without performing the predetermined transition operation to thereby view the enlarged image M10 corresponding to the reduced image M5. As a result, the user can check instantly the desired image in a larger size.

Moreover, according to this embodiment, the predetermined transition operation for the comparison screen mode can be performed by selecting a file before switching to the second display state, which enables the mode transition to take place without having to provide a particularly dedicated key.

Although the embodiment of the present invention is as described above, the present invention is not limited to this embodiment. In addition, the embodiment of the present invention can be appropriately modified in various manners. For example, the embodiment may be modified as described below.

Figure 11:
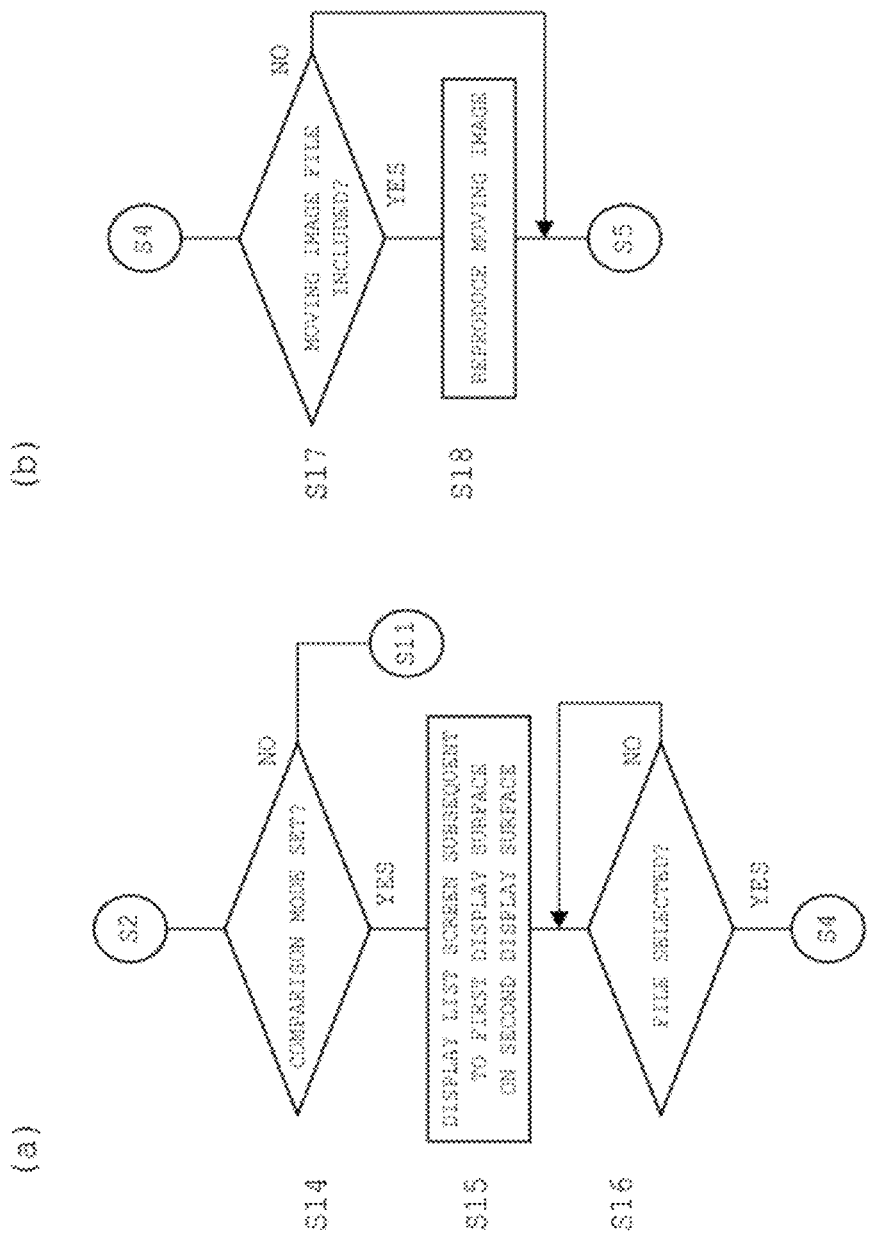
FIG. 11 is a flowchart for describing a modified example of a screen display control of the mobile phone of the embodiment in the data display mode.

FIG. 11 is a flowchart for describing a modified example of a screen display control in the data display mode: FIG. 11 (*a*) shows a flowchart of modified example 1; and FIG. 11 (*b*) shows a flowchart of modified example 2.

Figure 10:
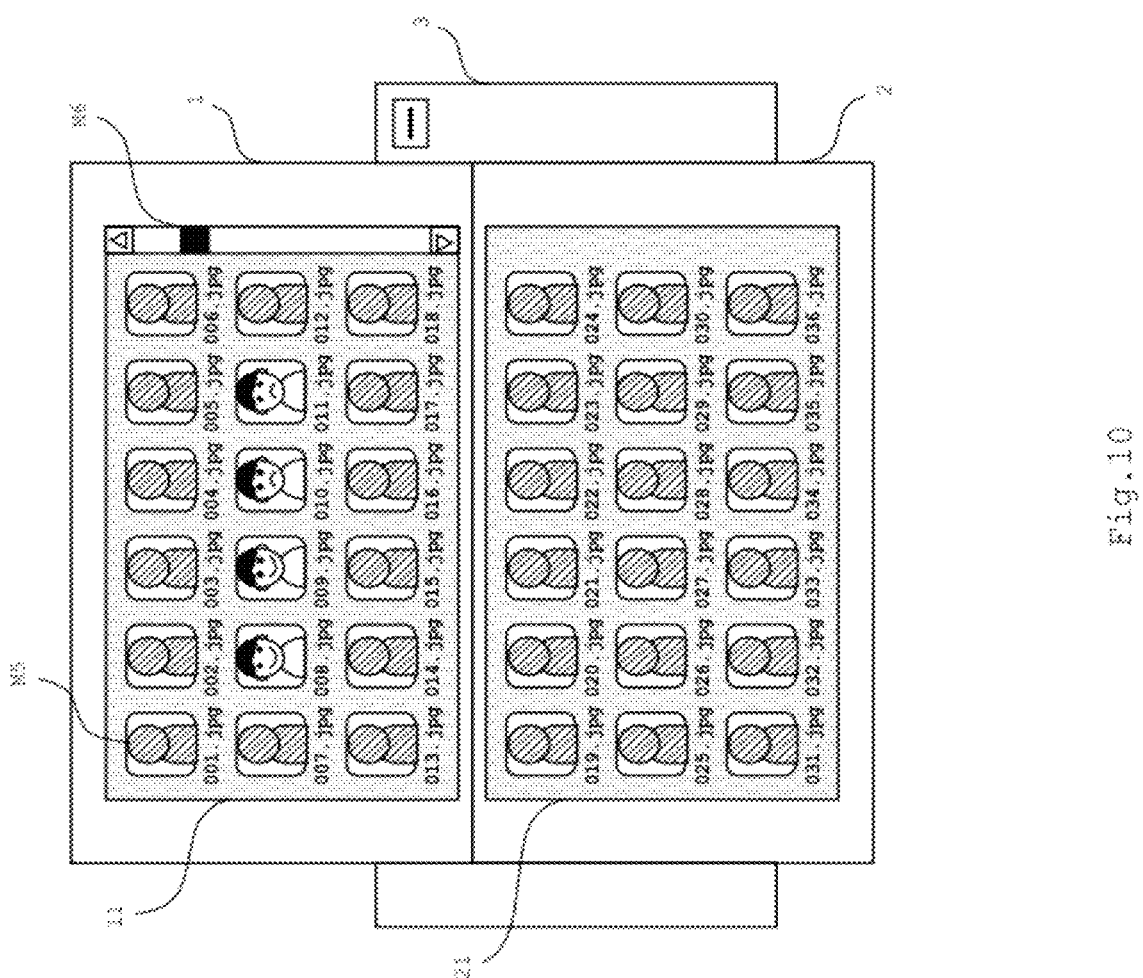
FIG. 10 is a diagram showing an example of screen display of the mobile phone of the embodiment under the screen display control in the data display mode.

In modified example 1, actions of steps S14 to S16 are performed instead of the action of step S3 in the foregoing embodiment. Specifically, in the configuration of modified example 1, upon transition to the second display state, a list screen shown in FIG. 10 appears both on the first display surface 11 and the second display surface 21. Then, if the user selects a desired file in this state, the screen is switched to the display pattern shown in FIG. 9 or 10. To which of the display patterns in FIGS. 9 and 10 the screen will be switched is preset by the user. Here, a mode with a switch to the display pattern of FIG. 9 is called "comparison mode," and a mode with a switch to the display pattern of FIG. 10 is called "enlargement mode." These modes are set by operating the "setting" mode key M1 on the initial screen shown in FIG. 4, for example.

If determining at step S2 that the screen is switched to the second display state, the display control section 110 then determines whether the display mode after the switching is set to the comparison mode (S14). Then, if determining that the comparison mode is set, the display control section 110 performs the same action of step S11 described above to show the list screen of reduced images M5 subsequent to the first display surface 11, on the second display surface 21 (S15). Accordingly, the same screen as that of FIG. 10 appears.

Further, in this state, if the user selects a desired file from the list screen of the first display surface 11 and the second display surface 21 (S16:YES), the display control section 110 performs the action of step S4 described above. Accordingly, as shown in FIG. 7, the second display surface 21 displays three images, that is, the intermediate image M7 of the selected file and the intermediate images M8 and M9 of the file anterior or prior to the selected file.

Figure 8:
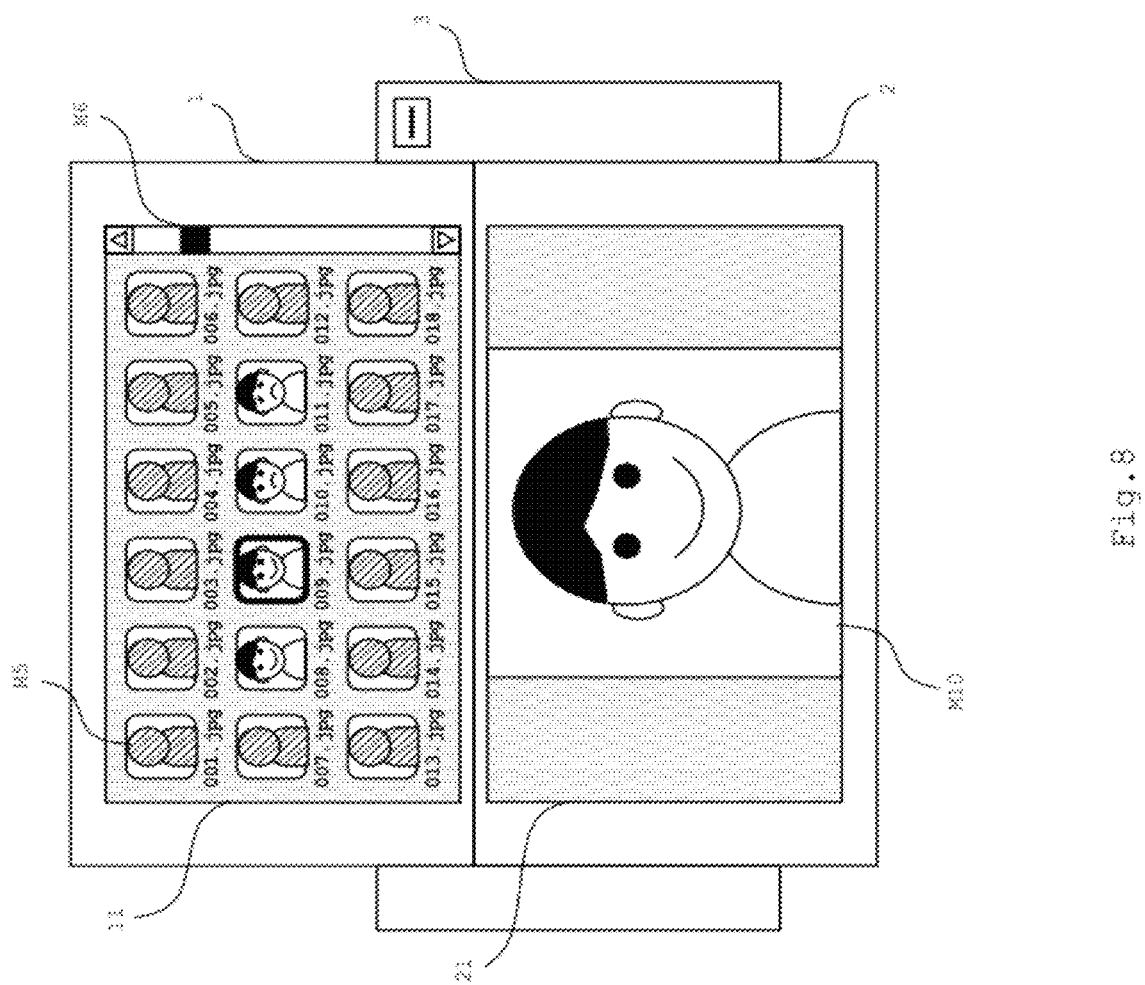
FIG. 8 is a diagram showing an example of screen display of the mobile phone of the embodiment under the screen display control in the data display mode.

Meanwhile, if determining at step S14 that the comparison mode is not set (the enlargement mode is set), the display control section 110 moves to the process of step S11 shown in FIG. 5. Specifically, the display control section 110 shows the list screen of reduced images M5 subsequent to the first display surface 11, on the second display surface 21 (S11). Accordingly, the same screen as that of FIG. 10 appears. Further, in this state, if the user selects a desired file from the list screen of the first display surface 11 and the second display surface 21 (S12:YES), the display control section 110 performs the action of step S13 described above. Accordingly, the enlarged image M10 of the selected file is displayed as shown in FIG. 8.

Through the action of step S15, the display control section 110 may show a message screen for prompting the user to select a file as shown in FIG. 12, instead of showing the list screen, on the second display surface 21.

Next, in modified example 2, actions of steps S17 and S18 are added to between the action of step S4 and the action of step S5 in the foregoing embodiment. Specifically, in the foregoing embodiment, only reduced images of still image files are provided on the list screen, whereas in a configuration of modification 2, if the memory saves moving image files and still image files, reduced images of these files are provided in a mixed state on the list screen. In such a configuration, upon transition to the comparison screen mode, the display control section 110 determines whether a selected file and files anterior and prior to the selected file include any moving image (S17). If those files include any moving image (S17: YES), the display control section 110 sends out an image signal for reproduction of the moving image to the liquid crystal display device 500. Accordingly, out of the three intermediate images displayed on the comparison screen of second display surface 21, the intermediate image of the moving image file is displayed in a state of moving image in the screen pattern shown in FIG. 7. In such a configuration, when viewing the intermediate image, the user can identify easily that the original image is a moving image. In addition, if there exists a plurality of intermediate images of moving images, the user can easily compare those moving images.

Alternatively, the device may be configured to have a list screen only for moving images separately from the list screen only for still images, such that, if the comparative screen mode is enabled from the list screen for moving images, intermediate images are shown in a state of moving images.

Further, in the foregoing embodiment, when the user selects one file on the list screen, the device displays the intermediate image M7 of the selected file and the intermediate images M8 and M9 of files adjacent the selected file. This is because, in many cases, similar images such as a series of photographs are stored under successive file names and arranged adjacent to each other on the list screen. However, if the file name is changed or the like, similar images may be undesirably arranged in separate positions on the list screen as shown in FIG. 13. Therefore, the following configuration may be employed to address such a situation.

Configuration Example 1

In this configuration example, the memory 600 stores image data in association with time information. For display in an enlarged size, images with close time information are selected and displayed as similar images. Here, time information is desirably provided by seconds or less for enhanced accuracy of sorting out images. For example, if time information is provided by minutes, a large number of images will have time information on the same time scale (minutes), which increases a possibility that some of those images are not similar images. To avoid this situation, time information is desirably provided by seconds or less.

If a user takes pictures with the camera module 13 in the foregoing configuration example shown in FIG. 3, time information at start of shooting is acquired from an internal clock, and image data is stored in the memory 600 in association with the time information. At that time, the time information is set by seconds, desirably, on a time scale shorter than second. In this case, if images with close times are selected, these images are generally found to be similar to each other.

However, the memory 600 may contain image data acquired from another device via telecommunications. In this case, the image data is also generally associated with time information (shooting time and the like), but the time information may be set on a time scale longer than second (e.g. date) depending on the settings of the other device. Accordingly, in this case, a large number of images may be selected in terms of close times, and those images may include images not similar to each other. Therefore, in this case, those selected images need to be further filtered. As standards for the filtering, for example, file names (file numbers) or the like may be used to select images with close file names (file numbers), as in the foregoing embodiment. Alternatively, if those images are provided with position information through a global positioning system (GPS), the position information may be used to select images with close position information.

As foregoing, if images are to be selected based on the time information, when a user selects a desired file, for example, file "009.jpg" from the list screen shown in FIG. 13, the display control section 110 executes the following actions, instead of the action of step S4 in the comparison screen mode enabled in the foregoing embodiment.

Specifically, the display control section 110 reads two files closer to the selected file in shooting date and time from the memory 600 in descending order of closeness, and shows intermediate images M8 and M9 of the two files on the second display surface 21 together with an intermediate image M7 of the selected file. If there exist three or more files with close shooting dates and times, the display control section 110 selects two files from those images based on file names (file numbers) or position information as stated above. Accordingly, the second display surface 21 shows the selected image and the images similar to the selected image (for example, "008.jpg" and "child1.jpg") regardless of positions on the list screen, as shown in FIG. 14.

Meanwhile, if any file is older than the selected file to some extent in shooting time, the file is regarded as having not been shot around the same time as the selected file and thus being not similar to the selected file. Accordingly, the device may be configured to, even when two files close in shooting time to the selected file are extracted, if any of the images are older beyond a predetermined time, provide no intermediate image of the file.

Configuration Example 2

As stated above, similar images may be selected based on data of shooting positions (shooting position data). In this case, the memory 600 stores the shooting position data in association with the image data. The configuration shown in FIG. 3 is provided with a GPS function. Specifically, the configuration shown in FIG. 3 is provided with a GPS antenna and a GPS communication processing section. The GPS communication processing section communicates with a GPS satellite via the GPS antenna to acquire position information. The memory 600 stores the position information acquired at the time of shooting as shooting position data together with the image data.

In this case, if the user selects a desired file from the list screen shown in FIG. 13, the display control section 110 reads two files close in shooting position to the selected file from the memory 600 in descending order of closeness, and shows the intermediate images M8 and M9 of the two files on the second display surface 21 together with the intermediate image M7 of the selected file (refer to FIG. 14).

Depending on accuracy of position detection by the GPS communication processing section, slight position differences may not be identified and thus a plurality of files may be determined as identical in shooting position. To address such a situation, the device may be configured to carry out file extraction based on both the information of shooting position and the information of shooting time.

Further, in the foregoing embodiment and configuration example, if the user selects a desired file from the list screen, the device displays intermediate images of files seeming to be similar to the image of the selected file, regardless of the file type such as moving image or still image. However, for example, if similar images contain both moving images and still images, the user may wish to compare only similar still images or only similar moving images. Therefore, the device may be configured to extract images seeming to be similar from files of the same type as the selected file.

Besides, in the foregoing embodiment, if the user touches the central intermediate image M7 on the comparison screen, the enlarged image M10 is displayed accordingly, and if the user touches the left and right intermediate images M8 and M9, these intermediate images are scrolled up and down accordingly. However, the present invention is not limited by this configuration, and may be configured to, even if the user touches any of the three intermediate images M7, M8, and M9, show an enlarged image of the touched file. In such a configuration, the scroll operating section may be arranged on the comparison screen so that the user can operate the scroll operating section to scroll the intermediate images up and down.

In addition, in the foregoing embodiment, the comparison screen displays three intermediate images. However, the present invention is not limited to this, and may display two or four or more intermediate images. Nevertheless, the more intermediate images, the smaller in size the intermediate images become. Accordingly, the number of intermediate images needs to be set such that the intermediate images do not become too small in size with respect to the display area.

In the foregoing embodiment, images seeming to be similar are extracted. However, the extracted images are not necessarily similar and only need to satisfy the preset similarity standards such as file name, time, and position described above in relation to the foregoing configuration.

Besides, the embodiments of the present invention can be modified in various manners as appropriate within the scope of a technical idea shown in the claims.

What is claimed is:

1. A terminal with a display function, comprising:
a first display section having a first display surface;
a second display section having a second display surface;
a display control section for controlling displays on the first display section and the second display section; and
a storing section for storing a plurality of pieces of image information, wherein the display control section exercises a first display control on one of the first display section and the second display section to show a list of the plurality of pieces of image information; and the display control section exercises a second display control on the other display section to show image information meeting predetermined similarity standards with respect to image information selected from the list.

2. The terminal with a display function according to claim 1, wherein
the display control section, in response to an instruction for enlargement of image information displayed under the second display control, shows the image information in a size larger than a size displayed under the second display control.

3. The terminal with a display function according to claim 1, wherein
the display control section, in response to an instruction for scrolling of image information displayed under the second display control, scrolls the displayed image information.

4. The terminal with a display function according to claim 1, wherein
when a user newly selects desired image information from the list displayed under the first display control, the display control section updates image information displayed under the second display control in accordance with the new selection.

5. The terminal with a display function according to claim 1, wherein
the image information includes moving image information, and
the display control section reproduces and displays the moving image information included in the display target under the second display control.

6. The terminal with a display function according to claim 1, further comprising:
a switching section for switching the first display section and the second display section between a first display state in which only the first display surface is exposed and a second display state in which the first display surface and the second display surface are exposed, wherein
the display control section exercises the first display control in the first display state, and, when a user selects the image information in the first display state and then moves to the second display state, the display control section executes the first display control and the second display control in accordance with the movement.

7. The terminal with a display function according to claim 6, wherein
when a user does not select the image information in the first display state, the display control section executes the first display control on both the first and second display sections, in accordance with movement to the second display state.

8. The terminal with a display function according to claim 7, wherein
when a user selects one piece of image information after execution of the first display control on both the first and second display sections, the display control section displays the image information in a size larger than a size displayed under the second display control.

9. A display control method of a terminal with a display function comprising a first display section having a first display surface and a second display section having a second display surface, the method comprising:
a first display step of showing a list of the plurality of pieces of image information on one of the first display section and the second display section; and
a second display step of showing image information meeting predetermined similarity standards with respect to image information selected from the list on the other display section.

* * * * *